US 7,085,261 B2

(12) United States Patent
Ethridge et al.

(10) Patent No.: US 7,085,261 B2
(45) Date of Patent: Aug. 1, 2006

(54) DIGITAL PACKET NETWORK FOR THE LOCAL ACCESS LOOP

(75) Inventors: Barry J Ethridge, Fort Worth, TX (US); James J Gainer, Keller, TX (US); Mahlon D Kimbrough, Bedford, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 996 days.

(21) Appl. No.: 09/992,649

(22) Filed: Nov. 13, 2001

(65) Prior Publication Data

US 2002/0054589 A1 May 9, 2002

Related U.S. Application Data

(63) Continuation of application No. 09/100,392, filed on Jun. 19, 1998, now Pat. No. 6,353,609.

(51) Int. Cl.
*H04L 12/64* (2006.01)
(52) U.S. Cl. ........................... 370/352; 370/356
(58) Field of Classification Search ............ 370/352, 370/356
See application file for complete search history.

(56) References Cited

U.S. PATENT DOCUMENTS

| 4,058,672 A | 11/1977 | Crager et al. |
| 4,408,323 A | 10/1983 | Mongtomery |
| 4,476,559 A | 10/1984 | Brolin et al. |
| 4,534,024 A | 8/1985 | Maxemchuk et al. |
| 4,577,314 A | 3/1986 | Chu et al. |
| 4,592,048 A | 5/1986 | Beckner et al. |
| 4,730,311 A | 3/1988 | Carse et al. |
| 4,763,317 A | 8/1988 | Lehman et al. |
| 4,768,188 A | 8/1988 | Barnhart et al. |
| 4,771,425 A | 9/1988 | Baran et al. |
| 4,881,225 A | 11/1989 | Dyke et al. |
| 4,888,765 A | 12/1989 | Dyke |
| 4,903,292 A | 2/1990 | Dillon |
| 4,962,497 A | 10/1990 | Ferenc et al. |
| 4,967,193 A | 10/1990 | Dyke et al. |
| 5,014,266 A | 5/1991 | Bales et al. |
| 5,046,067 A | 9/1991 | Kimbrough |
| 5,247,347 A | 9/1993 | Litteral et al. |
| 5,263,081 A | 11/1993 | Nightingale et al. |
| 5,267,122 A | 11/1993 | Glover et al. |

(Continued)

FOREIGN PATENT DOCUMENTS

EP 789470 8/1997

(Continued)

OTHER PUBLICATIONS

DeTreville, J.D., "A Simulation-Based Comparison of Voice Transmission on CSMA/CD Networks and on Token Buses", AT&T Bell Laboratories Technical Journal, vol. 63, No. 1, Jan. 1984, pp. 33-55.

(Continued)

*Primary Examiner*—Melvin Marcelo
(74) *Attorney, Agent, or Firm*—Baker Botts L.L.P.

(57) ABSTRACT

A digital packet access network for transporting voice and data signals in the local loop between a central office location and a plurality of remote local users. The network architecture may also include: (1) a dual-pipelined structure for separately transporting the voice and data signals; (2) a mechanism for prioritizing the transport of the voice signals; or (3) a method of synchronizing the timing of the voice signals to a telephone switch.

22 Claims, 4 Drawing Sheets

U.S. PATENT DOCUMENTS

| | | |
|---|---|---|
| 5,287,344 A | 2/1994 | Bye et al. |
| 5,303,229 A | 4/1994 | Withers et al. |
| 5,325,223 A | 6/1994 | Bears |
| 5,341,374 A | 8/1994 | Lewen et al. |
| 5,349,457 A | 9/1994 | Bears |
| 5,355,362 A | 10/1994 | Gorshe et al. |
| 5,381,405 A | 1/1995 | Daugherty et al. |
| 5,383,180 A | 1/1995 | Kartalopoulos |
| 5,463,616 A | 10/1995 | Kruse et al. |
| 5,469,282 A | 11/1995 | Ishioka |
| 5,491,797 A | 2/1996 | Thompson et al. |
| 5,500,753 A | 3/1996 | Sutherland |
| 5,504,606 A | 4/1996 | Frigo |
| 5,526,353 A | 6/1996 | Henley et al. |
| 5,544,163 A | 8/1996 | Madonna |
| 5,544,164 A | 8/1996 | Baran |
| 5,555,244 A | 9/1996 | Gupta et al. |
| 5,566,239 A | 10/1996 | Garcia et al. |
| 5,572,347 A | 11/1996 | Burton et al. |
| 5,586,121 A | 12/1996 | Moura et al. |
| 5,594,734 A | 1/1997 | Worsley et al. |
| 5,600,469 A | 2/1997 | Yamazaki |
| 5,608,565 A | 3/1997 | Suzuki et al. |
| 5,617,423 A | 4/1997 | Li et al. |
| 5,640,387 A | 6/1997 | Takahashi et al. |
| 5,729,370 A | 3/1998 | Bernstein et al. |
| 5,742,596 A | 4/1998 | Baratz et al. |
| 5,784,377 A | 7/1998 | Baydar et al. |
| 5,991,292 A * | 11/1999 | Focsaneanu et al. ......... 370/352 |
| 6,122,255 A * | 9/2000 | Bartholomew et al. ...... 370/237 |
| 6,353,609 B1 * | 3/2002 | Ethridge et al. ............ 370/352 |
| 6,466,572 B1 * | 10/2002 | Ethridge et al. ............ 370/352 |
| 6,781,981 B1 * | 8/2004 | Kimbrough ................. 370/352 |

FOREIGN PATENT DOCUMENTS

| | | |
|---|---|---|
| EP | 629995 | 3/1998 |

OTHER PUBLICATIONS

Montgomery, Warren A., "Techniques for Packet Voice Synchronization", IEEE Journal on Selected Areas in Communucations, vol. Sac-1, No. 6, Dec. 1983, pp. 1022,1028.

* cited by examiner

DIGITAL PACKET NETWORK FOR THE LOCAL ACCESS LOOP

This application is a Continuation of prior application Ser. No. 09,100,392, filed Jun. 19, 1988, now U.S. Pat. No. 6,353,609.

BACKGROUND OF THE INVENTION

The present invention is related to the field of signal transmission in the local access loop between a central telephone office switching center and a plurality of local users. In particular, a packetized digital network architecture is provided that is capable of transporting high-quality voice and high-speed data packets between the central office and the plurality of users. This data-centric architecture provides many advantages over traditional voice-centric networks presently in use.

Prior to the explosive growth in the public's demand for data services, such as dial-up Internet access, the local loop access network transported mostly voice information. This present access network typically includes numerous twisted-pair wire connections between the plurality of user locations and a central office switch. These connections can be multiplexed in order to more efficiently transport voice calls to and from the central office. The present access network for the local loop is designed primarily to carry these voice signals, i.e., it is a voice-centric network.

Today, data traffic carried across telephone networks is growing exponentially, and by many measures may have already surpassed traditional voice traffic, due in large measure to the explosive growth of dial-up data connections. The basic problem with transporting data traffic over this voice-centric network, and in particular the local loop access part of the network, is that it is optimized for voice traffic, not data. The voice-centric structure of the access network limits the ability to receive and transmit high-speed data signals along with traditional quality voice signals. Simply put, the access part of the network is not well matched to the type of information it is now primarily transporting. As users demand higher and higher data transmission capabilities, the inefficiencies of the present access network will cause user demand to shift to other mediums of transport for fulfillment, such as satellite transmission, cable distribution, wireless services, etc.

An alternative present local access network that is available in some areas is a digital loop carrier ("DLC") system. DLC systems utilize fiber-optic distribution links and remote multiplexing devices to deliver voice and data signals to and from the local users. DLC systems are synchronous networks that include a device known as a Time-Slot Interchanger ("TSI"). The TSI allocates the available bandwidth of the DLC system in "chunks," and maps incoming DS-0 PCM telephone circuits from a digital switch to the allocated chucks of bandwidth. Each DS-0 telephone line is a digital 64 Kbps PCM-modulated link. (A DS-1 line comprises 24 DS-0 lines.)

The utilization of system bandwidth in a DLC network is non-optimal because the TSI assigns and maps a particular number of DS-0 lines to the available bandwidth of the system, whether or not those lines are being actively used for voice information. The relatively constant mapping function of the TSI creates "stranded bandwidth," i.e., bandwidth that is not being used by the system, and which cannot be reallocated to other links or users. By mapping the bandwidth in chunks to particular DS-0 lines, regardless of use, the TSI inevitably sets aside bandwidth that is unused by the system. Thus the TSI is non-optimal. In addition to this stranded bandwidth problem, the presently available DLC systems are complex, costly, and do not scale very effectively, meaning that it is not easy to expand the DLC system once it has been implemented in a particular area.

Another method of transporting voice and data in the local access loop is via a dial-up TCP/IP connection to the Internet. The dial-up connection to the Internet is created using a computer modem connection to a local Internet Service Provider ("ISP") over the standard voice-centric access network. This technique layers a digital data packet protocol (TCP/IP) on top of the analog voice circuit connecting the central office switch and the local user. Data signals are transported as TCP/IP packets at speeds of 30–50 Kbps, assuming a standard 56 Kbps modem is utilized. Voice signals can also be transported over this packet connection using a technique known as IP Telephony.

IP Telephony is a software transport technique that digitizes the user's voice, compresses the digitized voice signals, and then packs the compressed digitized voice signals into TCP/IP packets for transport across the dial-up connection. The main problems with IP Telephony are processing overhead; poor sound quality; and packet delay. Because of the asynchronous nature of the TCP/IP connection to the Internet, voice packets can get lost or delayed in transit, leading to a garbled sounding voice signal. This is unacceptable for most telephone customers. Furthermore, because of the need to process and compress the speech signals, IP Telephony adds significantly delays to the voice connection. This further erodes the quality of the voice signal. In addition, it is presently not possible to operate a fax or modem connection over an IP Telephony link, which further limits its general applicability to the local access loop.

In summary, none of the presently available techniques for transporting voice and data signals in the local access loop are optimized for transporting both voice and data traffic. Therefore, there remains a general need in this art for a network architecture for simultaneously transporting high-quality voice and high-speed data signals in the local access loop.

There remains an additional need for such a network architecture that is cost effective, scalable, bandwidth efficient, and is designed to evolve (or scale) as advances are made in digital packet switching hardware.

There remains an additional need for such a architecture in which voice and data signals are packetized and transported in the local access loop using packet-switching hardware that is readily available, highly integrated and cost effective.

There remains yet an additional need for a packet-switched local loop access system for transporting voice and data packets in which the voice packets are prioritized in order to ensure quality sound delivery.

There remains yet another need for a method of time-synchronizing the voice packets in such a packet-switched local loop access system.

SUMMARY OF THE INVENTION

The present invention overcomes the problems noted above and satisfies the needs in this field for a digital packet data access network for transporting voice and data signals in the local loop between a central office location and a plurality of remote local users. This invention enables the transport of high-quality voice signals over a local access network that is optimized for data traffic. The network architecture may include: (1) a dual-pipelined structure for segmenting the voice and data traffic and for separately transporting each on a different port; (2) a mechanism for prioritizing the transport of the voice signals; or (3) a method of synchronizing the timing of the voice signals to a central office switch. This architecture allows a telephone access network to be optimized for high-speed data transport, such as 10baseT 10 mB/sec data traffic, while providing traditional high-quality 64 Kbps PCM voice traffic. This architecture also avoids some of the inherent limitations of DLC systems, such as stranded bandwidth, by providing a virtual timeslot interchange based on packet addresses.

One embodiment of the present invention provides a network for transporting voice and data signals in the local loop between a central office switch and a plurality of local users, comprising: (1) a first converter located at the central office for converting the voice and data signals into packets; (2) a second converter located remotely from the central office and in the vicinity of a plurality of the local users for converting the voice and data packets into voice and data signals; and (3) a packet-switched network connected between the first and second converters for transporting the voice and data packets to and from the local users.

Another embodiment of the present invention provides a local loop access network, comprising: a central telephony gateway coupled to a plurality of information sources; a remote telephony gateway coupled to a plurality of user access devices; and a digital packet data network connected between the central telephony gateway and the remote telephony gateway for transporting information between the plurality of information sources and the local access devices.

Another embodiment of the present invention provides an access network for transporting voice and data signals between a plurality of local access devices and a central location, comprising: means for converting the voice and data signals generated by the local access devices into packets; packet network means for transporting the voice and data packets to the central location; and means for converting the voice and data packets transported by the packet network means into voice and data signals at the central location.

A preferred method of the present invention provides steps for transporting voice and data signals in the local access loop, comprising the steps of: receiving voice and data signals at a central location; converting the voice and data signals into a common digital packet format; transporting the voice and data packets to a plurality of local access devices using a digital packet switched network; and converting the voice and data packets into voice and data signals at the local access devices.

A more specific embodiment of the present invention provides a dual-pipeline digital packet data access network for transporting voice and data signals between a central office switch and a plurality of local access devices, comprising: a packet converter located at the central office switch for converting voice signals and data signals into a common digital packet format; a voice packet pipeline connected between the central office switch and the plurality of local access devices for transporting the voice signals; and a data packet pipeline connected between the central office switch and the plurality of local access devices for transporting the data signals.

Another, more specific method of the present invention provides steps for time-synchronizing voice signals in a local loop digital packet network connected between a central office location and a plurality of user access devices, comprising the steps of: deriving time-synchronization information from a local digital switch at the central office location on a periodic basis; converting the time synchronization information into a time synchronization packet; transporting the time synchronization packet to the plurality of user access devices; and locking the time clock of the local access device to the local digital switch using the time synchronization packet.

The present invention provides many advantages over the voice-centric access networks currently in use today. Not all of these advantages are simultaneously required to practice the invention as claimed, and the following list is merely illustrative of the types of benefits that may be provided, alone or in combination, by the present invention. These advantages include: (1) significant cost savings over DLC systems; (2) solves the stranded bandwidth problem associated with DLC systems; (3) allows the access network to be optimized for data traffic; (4) provides one network that supports both high-quality voice and high-speed data transport; (5) avoids the voice compression and buffering delays associated with IP Telephony, thus providing much higher quality sound connections, including the ability to support high-speed modem and fax connections over the voice-packet link; (6) prioritizes voice traffic and creates separate voice and data packet pipelines in order to ensure quality voice delivery while simultaneously providing high-speed data packet access; (7) provides voice packet synchronization in an asynchronous packet-switched network; and (8) the network structure builds upon high-performance packet-switching hardware and transport technologies that are scalable and that are rapidly evolving to permit faster and better packet-switching performance.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
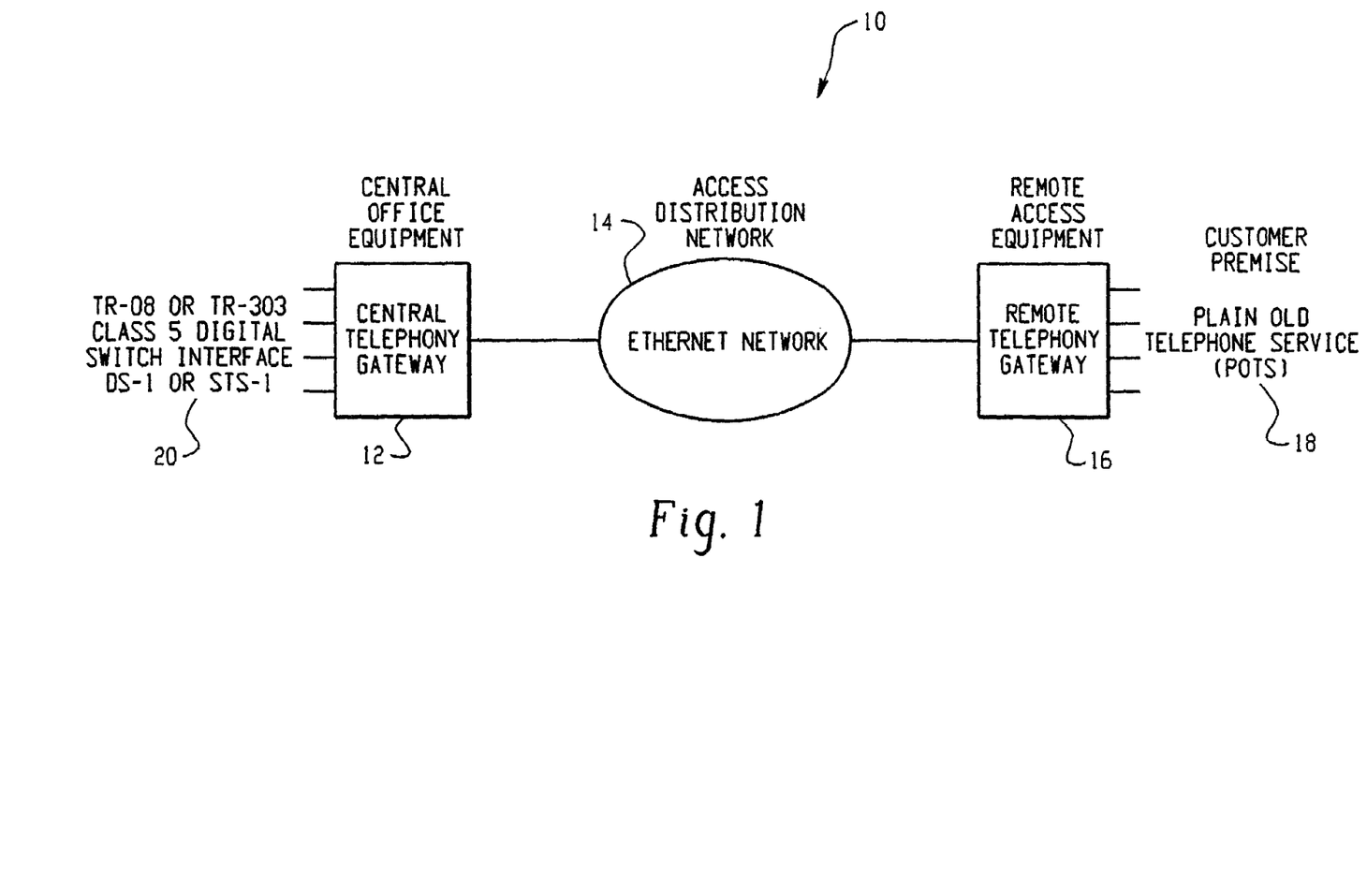
FIG. 1 is block diagram of a preferred digital packet access network for the local loop.

Referring now to the drawings, FIG. 1 sets forth a block diagram of a preferred digital packet access network 10 for the local loop. This network includes at least one central telephony gateway 12, at least one remote telephony gateway 16, and a packet-switched access distribution network 14, which couples the central telephony gateway 12 to the one or more remote telephony gateways 16. The central telephony gateway 16 interfaces with one or more voice and data information sources, such as a TR-08 or TR-303 class 5 digital switch interface that carries DS-1 voice traffic, or to an Internet data source, or some other type of data network. There is no limit to the type and number of voice and data information sources that could be interfaced to the central telephony gateway 12.

Although the central telephony gateway 12 is preferably located at the central office switch location, it could, alternatively be located at some other central office location. In addition to providing the interface to the plurality of information sources 20, the central telephony gateway 12 converts at least the voice signals (and in some cases the data signals as well) into a common packet format, such as an Ethernet packet having MAC addresses (Medium Access Control), for transport over the packet-switched access distribution network 14. (Note that in some cases, the voice and data packets may already be in a format that is compatible with the local loop packet data network, in which case the central telephony gateway would not need to convert them into some compatible format.) Other types of packets could also be used, and are within the scope and teaching of the present disclosure.

Since the bandwidth of the network is shared by the numerous virtual connections established by the packetization of the voice and data signals and the assignment of packet addressing, the problem of stranded bandwidth associated with DLC systems is eliminated in the present invention. There is no need in the present invention to allocate a certain amount of bandwidth and assign it to particular circuit connections. The asynchronous packet structure of the present invention permits an (almost) infinite number of virtual connections that can be easily established and torn-down with little overhead.

The access distribution network 14 is preferably an Ethernet network, but could, alternatively be any other type of packet-switched network. The Ethernet network routes the voice and data packets from the central telephony gateway 12 to the one or more remote telephony gateways 16 according to the assigned MAC addressing. Switching based on the MAC address is known as Layer-2 switching. Although switching and routing at Layer-2 of the OSI interconnect model is preferred in the present invention, the packets could, alternatively be routed at Layer-3 or Layer-4 assuming that appropriate Layer-3 or 4 switches/routers were included in the access distribution network 14.

The one or more remote telephony gateways 16 are located in the vicinity of the local users (or customers) 18. Numerous local users 18 can be connected to the same remote telephony gateway 16. The primary purpose of the remote telephone gateway 16 is to route the voice and data packets to the appropriate user devices based on the packet addressing. Another purpose of the remote telephony gateway 16 is to convert the voice and data packets back into voice and data signals that are compatible with user devices, such as a telephone, fax machine, or computer, to name a few, which are generally located at the local user premises 18. (Note that in some cases the user access devices may be expecting voice and data packets that are compatible with the packet data network, in which case there would be no need to convert the packets into any other signals prior to routing them to the user access devices.) In terms of voice signals, the voice packets are preferably converted by the remote telephony gateway 16 back into Plain Old Telephone Service (POTS) signal levels.

Because of the conversion back into POTS, or other voice and data signals that are compatible with standard user devices, the present invention 10 can operate as a drop-in replacement for the present voice-centric network. The customer (or user) should not have to purchase new user devices or equipment in order to communicate voice or data as previously communicated over the voice-centric network. The user can still make telephone calls, fax, create a dial-up modem connection, etc. In addition to these standard voice-centric services, the data-centric nature of the present invention provides high-speed symmetrical data connection at speeds in excess of 10 Mb/sec. In addition, the present invention opens up the possibility of an entirely new class of packet-oriented user devices, such as digital packet data telephones, fax machines, video-phones, or any other communication device that can directly communicate over the local loop packet data network.

The general solution provided by the present invention presented several problems, such as: (1) how to map DS-0 PCM voice traffic into Ethernet packets (or frames) to support high-quality voice with minimum delay; (2) how to prioritize the voice packets throughout the network to minimize frame-delay variations and eliminate frame loss for the voice traffic; and (3) how to synchronize the voice packets across the network in order to ensure quality voice service. Each of these problems has been solved by the system and methods of the present invention, as described in more detail below.

Figure 2:
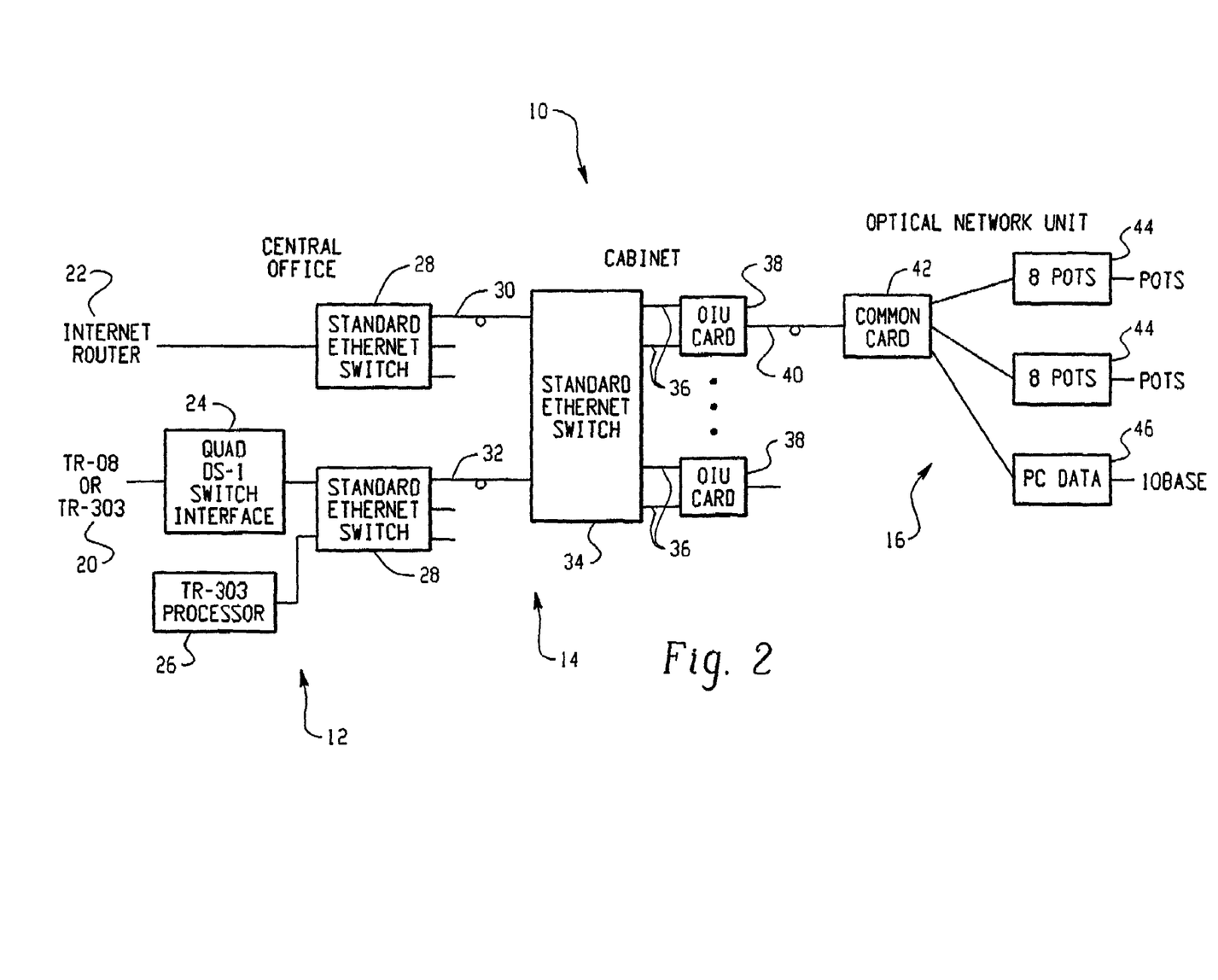
FIG. 2 is a more detailed bock diagram of one embodiment of the preferred digital packet access network for the local loop set forth in FIG. 1.

FIG. 2 sets forth a more detailed block diagram of one embodiment of the preferred digital packet access network for the local loop set forth in FIG. 1. This embodiment includes a dual-pipelined (or dual-ported) structure for separately transporting the voice and data packets between the central office 12 and the one or more remote cabinets 14 that contain packet switching circuitry 34, and which further connect to a plurality of local optical-network units 16 ("ONUs"), which are physically located near a plurality of local users.

Between the central office equipment 12 and the remote cabinet 14, the data and voice packets are preferably transported on separate lines 30, 32, although, in an alternative embodiment described in more detail below, these separate lines could be combined using a technique known as wavelength division multiplexing ("WDM"). The packets are segmented onto the separate lines at the central office 12. The segmented voice and data packets are merged at the one or more remote cabinets 14 and switched to the appropriate ONU access device 16 over a single fiber connection 40. The voice packets are preferably given priority transmission between the remote cabinet and the plurality of optical network units 16 in order to avoid the problem of frame delay associated with data bursts, as described below in connection with FIGS. 3 and 4.

The network architecture 10 for transporting voice and data packets in the local loop shown in FIG. 2 includes central office interfacing, converting and switching equipment 12, remote cabinet switching and multiplexing equipment 14, and local optical network unit distribution equipment 16. The central office interfacing converting and switching equipment includes one or more standard Ethernet switches 28, interface circuitry (not shown) for connecting the Ethernet switch to a data network, such as the Internet 22 or some other data network, and a voice interface circuit 24, 26 such as a Quad DS-1 switch interface or a TR-303 processor, for connecting the Ethernet switch 28 to a voice network 20 using standard protocols such as TR-08 or TR-303. The Quad-DS-1 switch interface 24 converts DS-0 PCM voice signals into voice packets for transport over the packet data network.

The embodiment of the present invention set forth in FIG. 2 includes two Layer-2 Ethernet switches 28 at the central office, one for the data packets and one for the voice packets. Alternatively, one switch with multiple ports could be used instead of two separate switches, and the actual switching operation could be made at other layers of the OSI model, such as Layer-3 or Layer-4, depending upon the application, and the technology embodied in the switching circuitry 28. The preferred packet map of the present invention set forth in Table 1, below, takes into account higher-layer switching by providing space for IP and UDP header information. ATM switching is also within the scope of the present invention.

The architecture of the present invention is scalable from a simple installation consisting of one remote cabinet and a few ONU access devices to a more complex system having multiple levels of multiple remote cabinets feeding multiple ONU devices. The scalability of the invention is provided by the modularity inherent to an Ethernet packet switching environment and the fact that each packet, voice or data, carries its own routing information and therefore can be easily directed to the correct destination ONU access device. Additional capabilities can be added to the system by simply adding more switches, hubs, etc., until the system has sufficient capacity. This scalability feature is a major advantage of the present invention over DLC architectures and other presently available voice-centric network structures.

Table 1, set forth below, shows the preferred mapping of PCM voice signals to Ethernet packets according to the present invention. Other data maps could also be used. The data packet includes 77 bytes. Bytes 0–5 and 6–11 correspond, respectively, to the destination and source MAC addresses. These addresses are used by the Ethernet switches to determine where to route a particular data packet. Bytes 12–13 indicate the packet type. The packet type indicates whether the packet is the original Ethernet packet type developed Digital, Intel and Xerox, or the IEEE version of the Ethernet packet. An IP Header and a UDP (User Datagram Protocol) header are stored at bytes 14–33 and 34–41, respectively. These fields are not required in the preferred embodiment in which the Ethernet switches route the packets using Layer-2 switching, but are reserved for advanced services which may include switching at Layer-3 and Layer-4. Byte 42 indicates the message type. Byte 43 includes telephone signaling information, such as "off hook", "ringing", "forward", "disconnect", etc. Bytes 44–67 contain the actual PCM data bytes that represent the voice signal. In this preferred data mapping, 3 ms of PCM data is stored in each Ethernet packet. Bytes 68–72 are the CUDL (Channel Unit Data Link), and bytes 73–77 provide a cyclic-redundancy check (or CRC) for the entire data packet. The CRC is used to determine if there has been an error during packet transmission.

TABLE 1

PCM to Ethernet Mapping

| Bytes | Description |
|---|---|
| 0–5 | Destination MAC Address |
| 6–11 | Source MAC Address |
| 12–13 | Packet Type |
| 14–33 | IP Header |
| 34–41 | UDP Header |
| 42 | Message Type |
| 43 | Signaling Information |
| 44–67 | PCM bytes (3 ms) |
| 68–72 | CUDL |
| 73–77 | CRC |

Turning back to FIG. 2, extending out from the central office switch are a plurality of fiber-optic (or other type) connections 30, 32, which transport the voice and data packets to a plurality of remote cabinets 14, which are preferably located in closer proximity to a number of local users. In the embodiment shown in FIG. 2, one data fiber 30 and one voice fiber 32 are connected to each remote cabinet 14, thus providing the dual-pipelined structure. For redundancy purposes, an additional pair of fibers could also be connected between the central office switching equipment 12 and the remote cabinets 14. Although it is possible to combine the data traffic flowing from the central office and back in a single fiber, in some cases there would also be a pair of return fibers for transmitting voice and data packets from the plurality of local users back to the central office equipment 12. If there are redundant fibers to these return fibers (as is common in the telecommunications industry), then the total number of fiber connections between the central office equipment 12 and a single remote cabinet 14 could be as many as eight fibers. In order to reduce the number of connections, wavelength-division multiplexing ("WDM") circuitry could be implemented between the central office and the remote cabinets. WDM multiplexes a plurality of different wavelengths onto a single optical fiber in order to increase the data carrying capacity of the fiber. In this manner, the eight previously mentioned connections could presently be reduced to two fibers each having four-way WDM processors on each end. In the future, these two fibers could be reduced to a single fiber with an eight-way WDM processor on each end.

Located at each remote cabinet 14 is a standard Ethernet switch 34 and a plurality of Optical Interface Unit ("OIU") cards 38. There is one OIU card for each connection from the remote cabinet 14 to the one or more local ONU devices 16. Each OIU is preferably connected to an ONU via a single fiber connection 40. The Ethernet switching circuitry at the remote cabinet 14 switches the data and voice packets from the plurality of fiber connections 30, 32 from the central office 12 to one or more of the OIU cards 38 via dual-port connections 36, one port for voice and the other for data. The OIU card 38 then multiplexes the dual-port data and voice packets onto a single connection for transport to the appropriate ONU 16.

The system shown in FIG. 2 preferably includes a plurality of ONU access devices 16 located near the premises of the local users. Although in some situations there may be one ONU per customer, such as with a mid-size or large business, or an apartment complex, in other situations multiple home users may share a single ONU access device 16. The purpose of the ONU access device 16 is to route the voice and data packets to the appropriate local user based upon the MAC address contained within the packets, and may also convert the data and voice packets into data and voice signals, or into other types of packets that are compatible with the user's communication devices.

The ONU access device 16 typically includes a common card for supplying power and basic services to the ONU, and a plurality of service cards, such as POTS cards 44, which can typically provide eight POTS voice lines, and PC-Data cards, which can typically provide 10baseT 10 Mb/sec symmetrical data service. Other services could also be provided by the ONU.

The connections 30, 32 between the one or more Ethernet switches 28 at the central office 12 and the one or more remote cabinets 14 are preferably 100BaseT 1000 Mb/sec fiber optic connections. Other high-speed connections using fiber optics, wireline, wireless, or other mediums could also be used for these connections. The connections 36 between the Ethernet switch 34 at each remote cabinet and the OIU cards are preferably 10BaseT connections, and the connections 40 between the remote cabinet and the one or more ONU access devices are preferably full-duplex 20 Mbps single fiber connections. Other high-speed connections using fiber optics, twisted-pair copper, coaxial, wireless, microwave, or other mediums could also be used for these connections.

Figure 3:
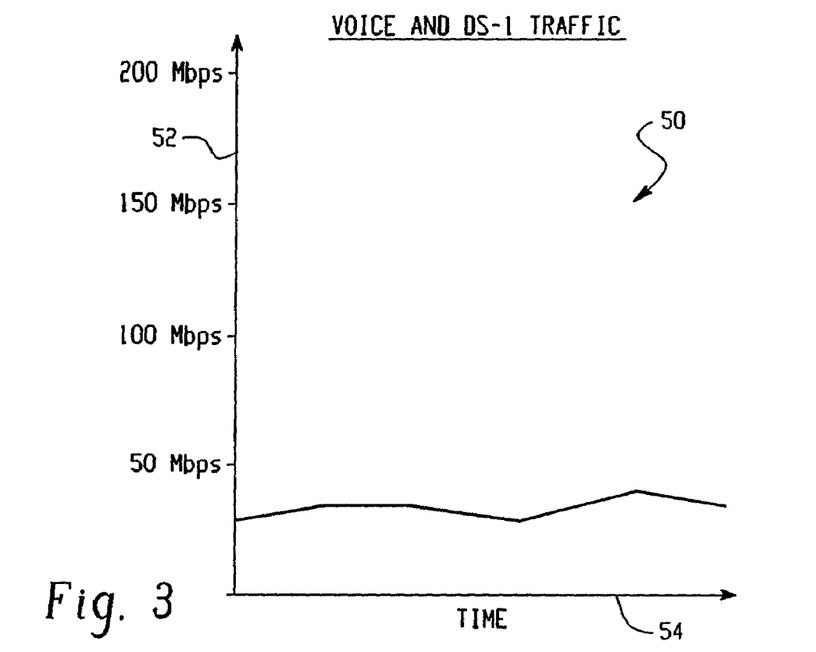
FIG. 3 is a graph showing typical voice traffic over time in the local loop.
Figure 4:
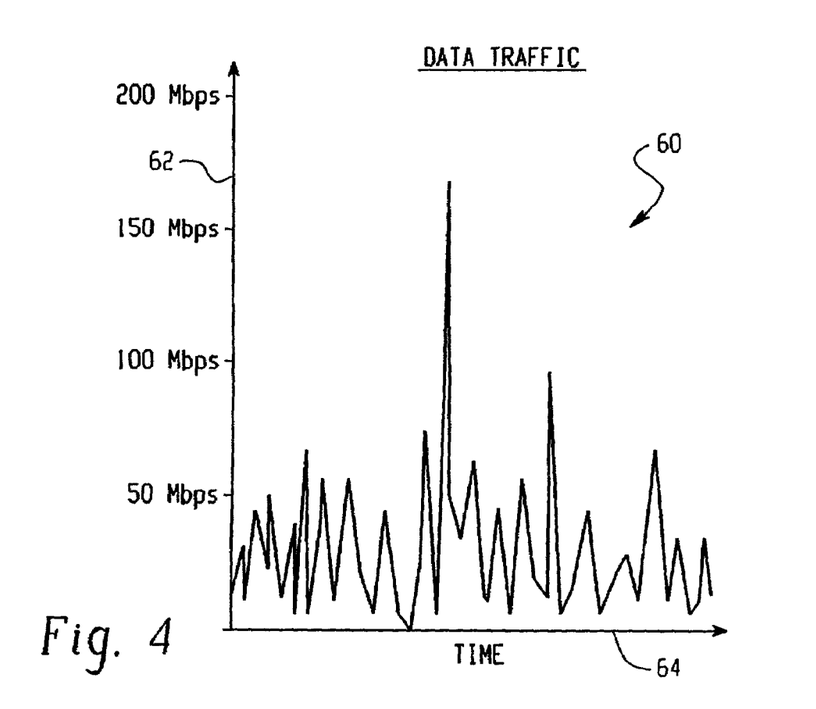
FIG. 4 is a graph showing typical data traffic over time in the local loop.

Turning for a moment to FIGS. 3 and 4, these figures show, respectively, graphs of typical voice 50 and data 60 traffic over time 54, 64 in the local loop (the x-axis 52, 62 in these graphs represents data rate in Mbps). As these graphs show, the voice traffic is relatively constant over time, whereas the data traffic is transmitted in "bursts," meaning that there are periods of very high demand for data and other periods of almost no demand. It is the high demand phase of the data graph that can make it difficult to simultaneously transmit high-quality voice signals along with the data over a single connection, which, in a packet environment, can lead to frame delay variation for the voice packets that may unacceptably degrade voice quality. Thus, a method and system are needed to ensure that the quality of the telephone conversations are not degraded during periods of high demand for data services.

Turning back to FIG. 2, the present invention meets this need by preferably segmenting the data and voice signals into separate pipelines for transport, and by prioritizing the delivery of voice packets between the OIU card 38, and the ONU 16. In this manner, high-speed data can be transported back and forth between the central office and the plurality of ONUs at the same time that high-quality phone conversations are transported.

The voice packets that are flowing on fiber connections 40 between the ONU 16 and the OIU 38 can be prioritized by knowing the type of service that each card in the ONU performs and by maintaining a buffer to store data that is received by each card. In the example system of FIG. 2, the ONU 16 includes three service cards, two POTS cards for voice service, and a single high-speed data card for data service. Other configurations of the ONU with additional services are, of course, possible. The ONU is programmed to know that voice services are associated with the POTS cards, and therefore, it can be programmed to give priority to data that is stored in the incoming buffers associated with those cards. So, for example, if a large data file is being transmitted via the PC Data card 46, and a local user picks up their phone to place a voice call, the ONU will transmit the last data packet of the file currently being transmitted, but then it will give priority to the voice call, and will transmit the voice packets. This is generally acceptable to users, since a change in the frequency of data transmission for a large file is rarely noticeable, whereas a change in the frequency of data transmission for a voice signal will greatly erode sound quality.

The same type of priority scheme is implemented at the OIU card 38. The OIU card 38 is connected to two ports 36 of the Ethernet switch 34. One port carries voice packets and the other carries data packets. The OIU multiplexes the packets from the two ports onto a single fiber connection 40, and gives priority to any voice packets. So, if there is data on the voice port, then that data is transmitted onto the fiber connection 40 first. If there is no data on the voice port, then the OIU 38 checks whether any data is on the data port, and if so, it then transmits that data onto the single fiber connection 40. Although FIG. 2 shows the dual-pipeline structure beginning at the central office 12 and ending at the one or more remote cabinets 14, it could, alternatively exist all the way to the ONU device 16, in which case no local priority scheme would be required.

One problem with implementing a packet voice network that interfaces to the public switched telephone network ("PSTN") is that the PSTN is a synchronous network, whereas a packet data network is inherently asynchronous. In present telephony access systems, DS-0 traffic must arrive at a constant rate that is synchronous to the clock of the local digital switch at the central office. A buffer could be used to absorb short term frame delay variations in the arrival rate of DS-0 PCM bytes, but if the POTS cards are constantly sending data faster or slower than the local digital switch expects it, then the buffer will overflow or underflow periodically. DLC systems use a phase-locked loop to synchronize each element to the element it communicates with in a timing distribution chain. This technique does not work in a packet network because of the asynchronous nature of the switching ports. Accordingly a method of synchronizing voice data in a local-loop packet data network is needed.

The present invention provides such a method, as follows. First, the time-synchronization information is derived from a local digital switch (such as via a TR-08 or TR-303 Class 5 digital switch interface, or some other type of switch) at the central office location on a periodic basis. The time synchronization information is then converted into a time synchronization packet. This time synchronization packet is then transported to a plurality of local access devices, such as the ONUs described in FIG. 2. And finally, the time clock of the local access device is locked to the local digital switch using the data in the time synchronization packet. In this manner, a completely asynchronous packet network can operate as a virtual synchronized network for purposes of voice packet transfer. This further enhances the perceived quality of the voice signals capable of transmission by the present invention.

Figure 5:
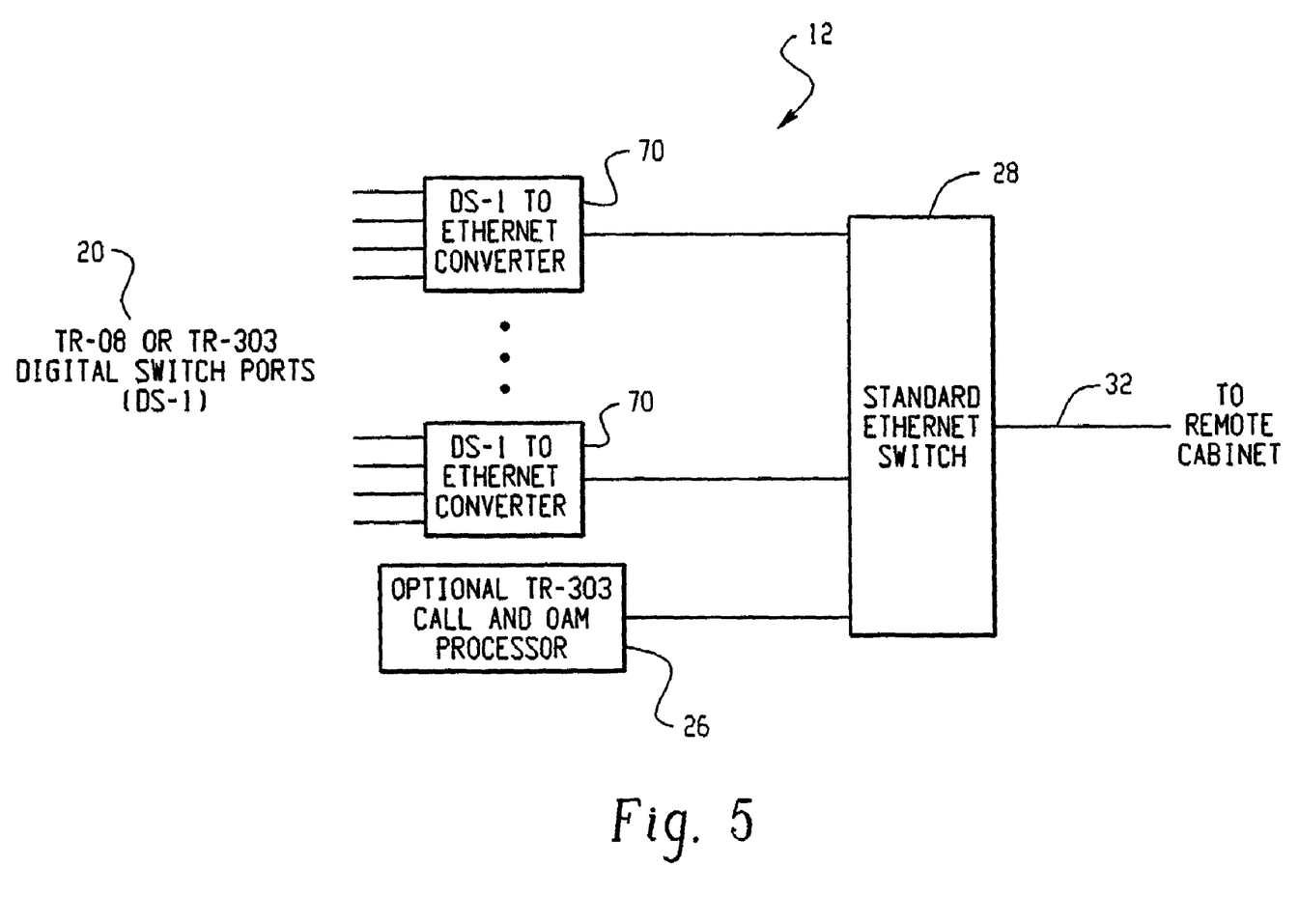
FIG. 5 is a more detailed block diagram of the packet conversion and switching circuitry located at the central office.

FIG. 5 sets forth a more detailed block diagram of the packet conversion and switching circuitry located at the central office. This circuitry includes one or more DS-1 to Ethernet converters 70, a standard Ethernet switch 28, and an optional TR-303 processor 26. The DS-1 to Ethernet converters 70 (also shown as device 24 in FIG. 2) take each of the DS-0 PCM digital telephone links that form the DS-1 link and converts the PCM voice signals into a plurality of packets according to the map shown in Table 1, above. Other packet mapping tables could, alternatively, be used. The connections between the DS-1 to Ethernet converters 70 and the standard Ethernet switch 28 are preferably 100BaseT connections, and the connection between the call processor 26 and the switch 28 is preferably a 10BaseT connection.

Not shown in this figure is the connection between the Ethernet switch 28 and the one or more data information sources, such as an Internet connection. In some situations, the data from the data information sources may already be in a packet format that is compatible with the access distribution network of the present invention, in which case these packets could be simply routed to the Ethernet switch(es) 28 at the central office. In other situations, however, the data from the data information sources may be in a different packet format, or may be in some non-packetized form. In this situation, additional packet converters would be required at the central office for to converting these data sources into data packets that are compatible with the mapping protocol associated with the access network.

The standard Ethernet switch 28 shown in FIG. 5 routes the voice packets from the DS-1 to Ethernet converters 70 to the appropriate remote cabinets via fiber connections 32. Each of the DS-1 to Ethernet converters 70 includes a TR-08 or TR-303 interface for connecting to a plurality of DS-1 links. The converters 70 preferably convert active 64 kbps PCM DS-0 links into Layer-2 Ethernet frames (or other types of Layer-2 switched frames) on 3 ms intervals with no data compression. Alternatively, the converters 70 could convert the DS-0 links to Layer-3 or 4 frames, and could use other time intervals, and may, in some cases use compression. The conversion functionality of the DS-1 to Ethernet converters 70 provides a virtual TSI using Layer-2 Ethernet addressing, thus overcoming the inefficiency of bandwidth "chunking" associated with DLC TSI devices. In some situations, the voice signals may arrive at the central switch in a packetized format, and may already be compatible with the local loop packet network.

Having described in detail the preferred embodiments of the present invention, including the preferred modes of operation, it is to be understood that this operation could be carried out with different elements and steps. This preferred embodiment is presented only by way of example and is not meant to limit the scope of the present invention which is defined by the following claims.

What is claimed:

1. A digital packet data network for transporting packetized voice and data signals in the local loop between a central office switch and a plurality of local users, comprising:
    a first converter located at the central office for converting the voice signals into voice packets and data signals into data packets, the first converter operable to provide priority processing treatment to voice packets over data packets;
    a second converter located remotely from the central office and in the vicinity of the local users for converting the voice packets into voice signals and the data packets into data signals, the second converter operable to provide priority processing treatment to voice packets over data packets; and
    a packet-switched network connected between the first and second converters for transporting the voice and data packets to and from the plurality of local users.

2. The digital packet data network of claim 1, further comprising:
    interface circuitry for coupling the first converter to information sources that provide the voice and data signals.

3. The digital packet data network of claim 1, wherein the first converter converts the voice signals into a packet format having addressing that enables layer-2 switching.

4. The digital packet data network of claim 1, wherein the data signals received by the first converter are already in data packets having a format compatible with the packet switched network.

5. The digital packet data network of claim 1, wherein the packet switched network is an Ethernet data network.

6. The digital packet data network of claim 5, wherein the packet switched network includes a plurality of Ethernet switching devices.

7. The digital packet data network of claim 6, wherein at least one Ethernet switching device is located at the central office, and at least one other Ethernet switching device is located remotely from the central office.

8. The digital packet data network of claim 1, wherein the packet switched network comprises a dual-pipelined network for separately transporting the voice and data packets.

9. The digital packet data network of claim 1, wherein the voice and data packets are separately transported between the central office and the plurality of local users.

10. The digital packet data network of claim 1, wherein the packet switched network comprises:
    at least one remote cabinet including a packet switching device; and
    a plurality of remote access devices coupled to the packet switching device and including the second converter.

11. The digital packet data network of claim 10, wherein the at least one remote cabinet includes two input ports for separately receiving voice and data packets from the central office.

12. The digital packet data network of claim 11, wherein the at least one remote cabinet includes a plurality of interface unit cards that multiplex voice and data packets onto a single output.

13. The digital packet data network of claim 12, wherein the single outputs of the interface unit cards are each coupled via a single fiber connection to a remote access device.

14. The digital packet data network of claim 1, further comprising:
    means for synchronizing the converted voice signals at the second converter to a local digital switch at the central office.

15. The digital packet data network of claim 1, wherein the means for synchronizing comprises:
    means for deriving time-synchronization information from the local digital switch at the central office location on a periodic basis;
    means for converting the time synchronization information into a time synchronization packet;
    means for transporting the time synchronization packet to a user access device associated with the second converter; and means for locking the time clock of the local access device to the local digital switch using the time synchronization packet.

16. A local loop access network, comprising:
    a central telephony gateway coupled to a plurality of information sources, the central telephony gateway operable to convert voice and data signals provided by the plurality of information sources into voice and data packets, the central telephony gateway operable to provide priority processing treatment to the voice packets over the data packets;
    a remote telephony gateway coupled to a plurality of user access devices, the remote telephony gateway operable to convert voice and data packets to voice and data signals for the user access devices, the remote telephony gateway operable to provide priority processing treatment to voice packets over data packets; and
    a digital packet data network connected between the central telephony gateway and the remote telephony gateway for transporting voice and data packets between the central telephony gateway and the remote telephony gateway.

17. An access network for transporting voice and data signals between a plurality of local access devices and a central location, comprising:

means for converting the voice and data signals generated by the local access devices into voice and data packets;

packet network means for transporting the voice and data packets to the central location; and means for converting the voice and data packets transported by the packet network means into voice and data signals at the central location;

means for providing priority processing treatment to voice packets over data packets.

18. A method of transporting voice and data signals in the local access loop, comprising:

receiving voice and data signals at a central office location;

converting the voice and data signals into voice packets and data packets having a common digital packet format;

providing priority processing treatment to voice packets over data packets;

transporting the voice and data packets to a plurality of local access devices using a digital packet switched network; and converting the voice and data packets into voice and data signals at the local access devices.

19. A dual-pipeline digital packet data access network for transporting voice and data signals between a central office switch and a plurality of local access devices, comprising:

a packet converter located at the central office switch for converting voice signals and data signals into voice packets and data packets having a common digital packet format, the packet converter providing priority processing treatment to voice packets over data packets;

a voice packet pipeline connected between the central office switch and the plurality of local access devices for transporting the voice packets; and a data packet pipeline connected between the central office switch and the plurality of local access devices for transporting the data packets.

20. The method of claim 18, further comprising:

deriving time-synchronization information from a local digital switch at the central office location on a periodic basis;

converting the time synchronization information into a time synchronization packet;

transporting the time synchronization packet to the plurality of local access devices; and locking the time clock of the local access device to the local digital switch using the time synchronization packet for synchronization of the voice packets.

21. A packet network for transporting voice signals in the local access loop, comprising:

a central telephony gateway located at a central office location for interfacing to a source of voice signal information and a source of data signal information;

a plurality of remote telephony gateways located remotely from the central office for interfacing to a plurality of local user access devices; and a packet-switched network coupled between the central telephony gateway and the plurality of remote telephony gateways for transporting the voice signal information and the data source information to and from the plurality of local user access devices, the central telephony gateway and the remote telephony gateways providing priority processing treatment to voice signal information over data signal information.

22. The packet network of claim 21, wherein the central telephony gateway derives time-synchronization information on a periodic basis, the central telephony gateway operable to convert the time synchronization information into a time synchronization packet, the central telephony gateway operable to transport the time synchronization packet to the plurality of remote telephony gateways, the plurality of remote telephony gateways operable to lock the time clock of associated local access devices using the time synchronization packet for synchronization of the voice packets.

* * * * *

UNITED STATES PATENT AND TRADEMARK OFFICE
CERTIFICATE OF CORRECTION

PATENT NO. : 7,085,261 B2  Page 1 of 1
APPLICATION NO. : 09/992649
DATED : August 1, 2006
INVENTOR(S) : Barry Joe Ethridge et al.

It is certified that error appears in the above-identified patent and that said Letters Patent is hereby corrected as shown below:

On the Title Page Item (75):
At Inventors, please delete "Barry J Ethridge" and insert -- Barry Joe Ethridge --. Delete "James J Gainer" and insert -- James Joseph Gainer --. Delete "Mahlon D Kimbrough" and insert -- Mahlon Danny Kimbrough --.

Column 1, Line 5:
After "No." delete "09,100,392" and insert -- 09/100,392 --.

Signed and Sealed this

Twenty-ninth Day of July, 2008

JON W. DUDAS
*Director of the United States Patent and Trademark Office*